US011053896B2

(12) United States Patent
Tani et al.

(10) Patent No.: US 11,053,896 B2
(45) Date of Patent: Jul. 6, 2021

(54) INTAKE PASSAGE STRUCTURE

(71) Applicant: HONDA MOTOR CO., LTD., Tokyo (JP)

(72) Inventors: Yusaburo Tani, Wako (JP); Tetsuya Takano, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 527 days.

(21) Appl. No.: 15/920,713

(22) Filed: Mar. 14, 2018

(65) Prior Publication Data
US 2018/0274502 A1    Sep. 27, 2018

(30) Foreign Application Priority Data

Mar. 27, 2017  (JP) .............................. JP2017-061237

(51) Int. Cl.
*B62M 7/02* (2006.01)
*F02M 35/10* (2006.01)
(Continued)

(52) U.S. Cl.
CPC ....... *F02M 35/10262* (2013.01); *B60K 11/06* (2013.01); *B62M 7/02* (2013.01);
(Continued)

(58) Field of Classification Search
CPC ....... F02M 35/10262; F02M 35/10301; F02M 35/10321; F02M 35/10354;
(Continued)

(56) References Cited

U.S. PATENT DOCUMENTS 4,463,711 A * 8/1984 Yoshioka ................ F02B 61/02
                                                    123/184.32
4,667,629 A * 5/1987 Hagarty ............... F02M 35/022
                                                    123/198 E
(Continued)

FOREIGN PATENT DOCUMENTS

JP    49-112024 A    10/1974
JP    52-166018 U    12/1977
(Continued)

OTHER PUBLICATIONS

Japanese Office Action, dated Apr. 3, 2019, for Japanese Application No. 2017-061237, with an English machine translation.
(Continued)

*Primary Examiner* — Anne Marie M Boehler
(74) *Attorney, Agent, or Firm* — Birch, Stewart, Kolasch & Birch LLP

(57) ABSTRACT

A plurality of parts that constitute an intake passage connected with an intake port of an engine include a constriction part that has a protrusion formed to protrude on an inner circumferential surface side of the intake passage. The constriction part includes cylindrical connections disposed on both sides of a constriction path in which the protrusion is formed. The constriction path has an outer circumferential surface recessed inwardly in a radial direction so as to follow a shape of the protrusion. A portion recessed most of the recessed outer circumferential surface is disposed inside inner circumferential surfaces of the connections in the radial direction. The constriction path has a uniform wall thickness. The constriction part is connected upstream of the throttle body.

10 Claims, 14 Drawing Sheets

(51) Int. Cl.
*F02M 35/16* (2006.01)
*F02M 35/12* (2006.01)
*F02D 9/10* (2006.01)
*B60K 11/06* (2006.01)
*F02D 9/02* (2006.01)
*F02D 41/00* (2006.01)

(52) U.S. Cl.
CPC .............. *F02D 9/02* (2013.01); *F02D 9/10* (2013.01); *F02M 35/10098* (2013.01); *F02M 35/10118* (2013.01); *F02M 35/10124* (2013.01); *F02M 35/10137* (2013.01); *F02M 35/10144* (2013.01); *F02M 35/10321* (2013.01); *F02M 35/1211* (2013.01); *F02M 35/162* (2013.01); *F02D 41/0002* (2013.01); *Y02T 10/12* (2013.01)

(58) Field of Classification Search
CPC .......... F02M 35/1216; F02M 35/1205; F02M 35/1283; F02M 35/10098; F02M 35/10118; F02M 35/10124; F02M 35/10137; F02M 35/10144; F02M 35/1211; F02M 35/162; B62M 7/02
USPC .......................................... 180/219
See application file for complete search history.

(56) References Cited

U.S. PATENT DOCUMENTS

| | | | |
|---|---|---|---|
| 5,216,985 A | 6/1993 | Brümmer et al. | |
| 7,281,511 B2* | 10/2007 | Quezada | F02M 35/10144 123/184.21 |
| 7,412,960 B2* | 8/2008 | Nishizawa | F02M 35/022 123/184.57 |
| 9,010,295 B2* | 4/2015 | Yamagishi | F02M 35/024 123/184.56 |
| 2003/0010310 A1* | 1/2003 | Pontoppidan | F02M 35/10124 123/184.42 |
| 2006/0230728 A1 | 10/2006 | Tsuruta et al. | |
| 2008/0023262 A1* | 1/2008 | Hayashi | F02M 35/10118 181/229 |
| 2010/0266395 A1* | 10/2010 | Hermann | F02M 35/10163 415/191 |
| 2011/0308494 A1 | 12/2011 | Lukasavitz et al. | |
| 2016/0123357 A1 | 5/2016 | Oun | |
| 2016/0177880 A1 | 6/2016 | Hartzler et al. | |
| 2017/0284350 A1* | 10/2017 | Ozaki | F02M 35/14 |

FOREIGN PATENT DOCUMENTS

| | | |
|---|---|---|
| JP | 56-161168 U | 12/1981 |
| JP | 2-105540 U | 8/1990 |
| JP | 6-53752 U | 7/1994 |
| JP | 10-77917 A | 3/1998 |
| JP | 2002-285816 A | 10/2002 |
| JP | 2009-275603 A | 11/2009 |
| JP | 2016-160766 A | 9/2016 |

OTHER PUBLICATIONS

European Office Action dated Jan. 17, 2020, for corresponding European Application No. 18161685.5.
Japanese Rejection Notice for Japanese Application No. 2017-061237, dated Aug. 29, 2018, with English translation.
Extended European Search Report for European Application No. 18161685.5, dated May 7, 2018.

* cited by examiner

ENGINE SIDE

INTAKE PASSAGE STRUCTURE

CROSS-REFERENCE TO RELATED APPLICATIONS

The present application claims priority under 35 USC 119 to Japanese Patent Application No. 2017-061237 filed Mar. 27, 2017 the entire contents of which are hereby expressly incorporated by reference.

TECHNICAL FIELD

The present invention relates generally to intake passage structures and, more particularly, to an intake passage structure applied to an intake passage connected with an intake port of an engine.

BACKGROUND ART

A known structure includes a throttle valve, disposed midway in an intake passage connected with an intake port of an engine, for changing a flow passage area of the intake passage.

Patent Document 1 discloses an arrangement in which an intake passage has a protrusion that protrudes, at a position upstream of a throttle valve, to the inside of the intake passage to thereby change a flow passage shape. Such a protrusion can affect, for example, an intake air amount and an intake air flow with respect to a throttle valve opening in any desired manner.

CITATION LIST

Patent Literature

Patent Document 1: JP-A-H2-105540

SUMMARY OF INVENTION

Technical Problem

The protrusion of the arrangement disclosed in Patent Document 1 is disposed on an inner circumferential surface that has been thickened without an outline of the intake passage being changed. Thus, unfortunately, the protrusion represents an increase in weight and a user, for example, can machine the protrusion to change the flow passage shape.

It is an object of the present invention to solve the foregoing problems and to provide an intake passage structure that can, through a simple structure, achieve reduction in weight of an intake passage and prevent a flow passage shape from being changed.

Solution to Problems

To achieve the afore-mentioned object, the present invention has a first feature in that an intake passage structure applicable to an intake passage (30) connected with an intake port (37) of an engine (18) and formed by connecting a plurality of parts including a throttle body (41) having a throttle valve (42), the intake passage structure comprising the plurality of parts include a constriction part (50, 150, 350) having a protrusion (60, 160, 360) that protrudes on an inner circumferential surface side of the intake passage (30), wherein the constriction part (50, 150, 350) includes cylindrical connections (52, 56, 152, 156, 352, 356) disposed on both sides of a constriction path (55, 155, 355) in which the protrusion (60, 160, 360) is formed, the connections (52, 56, 152, 156, 352, 356) connecting upstream and downstream parts, the constriction path (55, 155, 355) has an outer circumferential surface (62, 162, 362) recessed inwardly in a radial direction so as to follow a shape of the protrusion (60), and a portion recessed most (62a, 162a, 362a) of the recessed outer circumferential surface (62, 162, 362) is disposed inside inner circumferential surfaces (52a, 56a, 152a, 156a, 352a, 356a) of the connections (52, 56, 152, 156, 352, 356) in the radial direction.

The present invention has a second feature in that the constriction path (55, 155, 355) has a uniform wall thickness.

The present invention has a third feature in that the constriction part (50, 150, 350) is a connecting tube connected upstream of the throttle body (41).

The present invention has a fourth feature in that the constriction part (50, 150, 350) is formed of an elastic material, and the constriction path (55, 155, 355) has a rib (54, 154, 354) disposed on the outer circumferential surface (62, 162, 362) in a standing condition, the rib (54, 154, 354) connecting between the connections (52, 56, 152, 156, 352, 356).

The present invention has a fifth feature in that the intake passage (30) is formed to extend linearly.

The present invention has a sixth feature in that a constriction opening (59) constricted by an apex (60a) of the protrusion (60) has a circular cross-sectional shape concentric with the connections (52, 56).

The present invention has a seventh feature in that the protrusion (160) protrudes inwardly in a radial direction from a vehicle body inferior side of the constriction path (155), and the protrusion (160) forms a wall (160c) that extends substantially perpendicularly to a flow passage direction.

The present invention has an eighth feature in that a constriction opening (359) constricted by an apex (360a) of the protrusion (360) has an elliptical cross-sectional shape long in the vehicle width direction having a center at a position offset on the vehicle body inferior side with respect to the connections (352, 356).

Effects of the Invention

According to the first feature of the present invention, an intake passage structure applicable to an intake passage (30) connected with an intake port (37) of an engine (18) and formed by connecting a plurality of parts including a throttle body (41) having a throttle valve (42), the intake passage structure comprising the plurality of parts include a constriction part (50, 150, 350) having a protrusion (60, 160, 360) that protrudes on an inner circumferential surface side of the intake passage (30), wherein the constriction part (50, 150, 350) includes cylindrical connections (52, 56, 152, 156, 352, 356) disposed on both sides of a constriction path (55, 155, 355) in which the protrusion (60, 160, 360) is formed, the connections (52, 56, 152, 156, 352, 356) connecting upstream and downstream parts, the constriction path (55, 155, 355) has an outer circumferential surface (62, 162, 362) recessed inwardly in a radial direction so as to follow a shape of the protrusion (60), and a portion recessed most (62a, 162a, 362a) of the recessed outer circumferential surface (62, 162, 362) is disposed inside inner circumferential surfaces (52a, 56a, 152a, 156a, 352a, 356a) of the connections (52, 56, 152, 156, 352, 356) in the radial direction. Therefore, even with a large protrusion formed on the inner circumferential surface of the constriction part, the portion at which the protrusion is formed can have a minimized wall thickness, so that the weight of the intake passage can be prevented from increasing. Additionally, machining the protrusion results in a thinner wall thickness of the outer wall of the constriction path and in reduced strength. Thus, a user, for example, can be dissuaded from machining the protrusion to thereby change a flow passage shape.

According to the second feature of the present invention, the constriction path (55, 155, 355) has a uniform wall thickness. Therefore, an effect of preventing the flow passage shape from being changed can be enhanced, while reduction in weight of the constriction part is promoted.

According to the third feature of the present invention, the constriction part (50, 150, 350) is a connecting tube connected upstream of the throttle body (41). Therefore, an intake air amount is constricted at a position upstream of the throttle valve. This can reduce pressure load applied to the throttle valve, while reducing engine noise.

According to the fourth feature of the present invention, the constriction part (50, 150, 350) is formed of an elastic material, and the constriction path (55, 155, 355) has a rib (54, 154, 354) disposed on the outer circumferential surface (62, 162, 362) in a standing condition, the rib (54, 154, 354) connecting between the connections (52, 56, 152, 156, 352, 356). Therefore, the constriction part formed of an elastic material facilitates connection with the upstream and downstream parts. Additionally, rigidity enhanced by the rib allows deformation resistance of the constriction path to be enhanced.

According to the fifth feature of the present invention, the intake passage (30) is formed to extend linearly. Therefore, coupling rigidity among different parts constituting the intake passage can be easily enhanced and force to bend the intake passage is not likely to occur, so that the constriction part can be prevented from being deformed.

According to the sixth feature of the present invention, a constriction opening (59) constricted by an apex (60a) of the protrusion (60) has a circular cross-sectional shape concentric with the connections (52, 56). Therefore, rigidity of the constriction path can be readily made uniform in a circumferential direction.

According to the seventh feature of the present invention, the protrusion (160) protrudes inwardly in a radial direction from a vehicle body inferior side of the constriction path (155), and the protrusion (160) forms a wall (160c) that extends substantially perpendicularly to a flow passage direction. Therefore, even when a mixture heavier than air flows back along an inner circumferential surface on the vehicle body inferior side of the intake passage due to mixture spit-back, the wall of the protrusion is allowed to receive the mixture. Thus, the spit-back mixture can be prevented from reaching an air cleaner box and sticking to an air filter.

According to the eighth feature of the present invention, a constriction opening (359) constricted by an apex (360a) of the protrusion (360) has an elliptical cross-sectional shape long in the vehicle width direction having a center at a position offset on the vehicle body inferior side with respect to the connections (352, 356). Therefore, the intake flow passage is thus constricted to achieve reduced engine noise. In addition, the constriction opening disposed at the position offset inferiorly in the vehicle body results in the constriction opening being disposed on the inferior side in the vehicle body on which the intake passage starts to open as a throttle valve initiates an opening operation. This enables smooth inflow of the mixture particularly when a throttle opening remains small.

DESCRIPTION OF EMBODIMENTS

Figure 1:
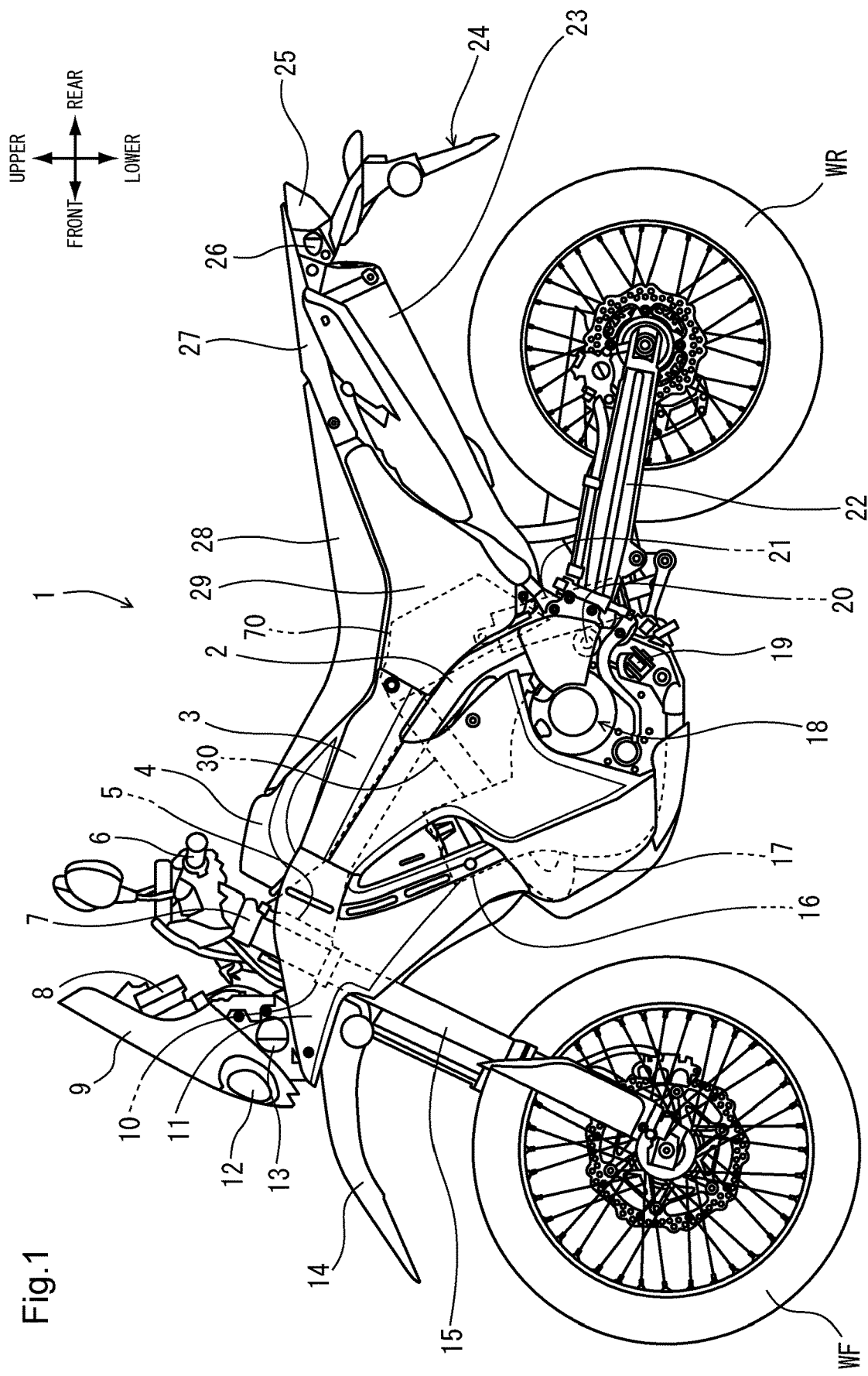
FIG. 1 is a left side elevational view of a motorcycle to which an intake passage structure according to an embodiment of the present invention is applied.

A specific preferred embodiment to which the present invention is applied will be described below with reference to the accompanying drawings. FIG. 1 is a left side elevational view of a motorcycle 1 to which an intake passage structure according to an embodiment of the present invention is applied. The motorcycle 1 is an off-road saddled vehicle that travels by transmitting driving power of an engine 18 as a power source to a rear wheel WR.

A head pipe 5 is disposed at a vehicle body anterior end portion of a vehicle body frame 2. The head pipe 5 oscillatably journals a steering stem not depicted. A pair of left and right front forks 15 is supported by a top bridge 7 and a bottom bridge 10 that are fixed to the steering stem at upper and lower portions, respectively, of the head pipe 5. The front forks 15 rotatably journal a front wheel WF. A steering handlebar 6 is mounted on an upper portion of the top bridge 7.

The engine 18 is disposed at a lower portion of the vehicle body frame 2. A pivot 20 is disposed at a rear end lower portion of the vehicle body frame 2. The pivot 20 swingably journals a front end portion of a swing arm 22. The swing arm 22 rotatably journals the rear wheel WR. A rear cushion 21 suspends an anterior side of the swing arm 22 on the vehicle body frame 2. A pair of left and right steps 19 is disposed inferior to the pivot 20. A rider can rest his or her feet on the steps 19.

A headlight 12, a pair of left and right direction indicators 13, a meter unit 8, and a screen 9 are disposed anterior to the steering handlebar 6. The headlight 12 is fixed to the side of the head pipe 5. The meter unit 8 displays information such as a speedometer and an odometer. The screen 9 covers an area around the headlight 12. A front fender 14 is disposed inferior to the direction indicators 13. The front fender 14 is fixed to the front forks 15.

A fuel tank 4 is disposed between the steering handlebar 6 and a seat 28. The fuel tank 4 is fixed to the vehicle body frame 2. A side cowl 29 is disposed inferior to the seat 28 and a seat cowl 27 is disposed posterior to the seat 28. A pair of left and right radiator shrouds 11 is disposed outside the respective front forks 15 in a vehicle width direction. A pair of left and right side covers 3 is connected posteriorly with rear portions of the radiator shrouds 11. A taillight unit 25 and a pair of left and right rear-side direction indicators 26 are disposed posterior to the seat cowl 27. A rear fender 24 is disposed inferior to the taillight unit 25.

An exhaust pipe 17 is connected with an exhaust port disposed at a vehicle body anterior side of a cylinder head 16 of the engine 18. The exhaust pipe 17 guides combustion gas to a muffler 23. An intake passage 30 is connected with an intake port disposed at a vehicle body posterior side of the cylinder head 16. An intake passage structure according to an embodiment of the present invention is applied to the intake passage 30. An air cleaner box 70 is connected upstream of the intake passage 30.

Figure 2:
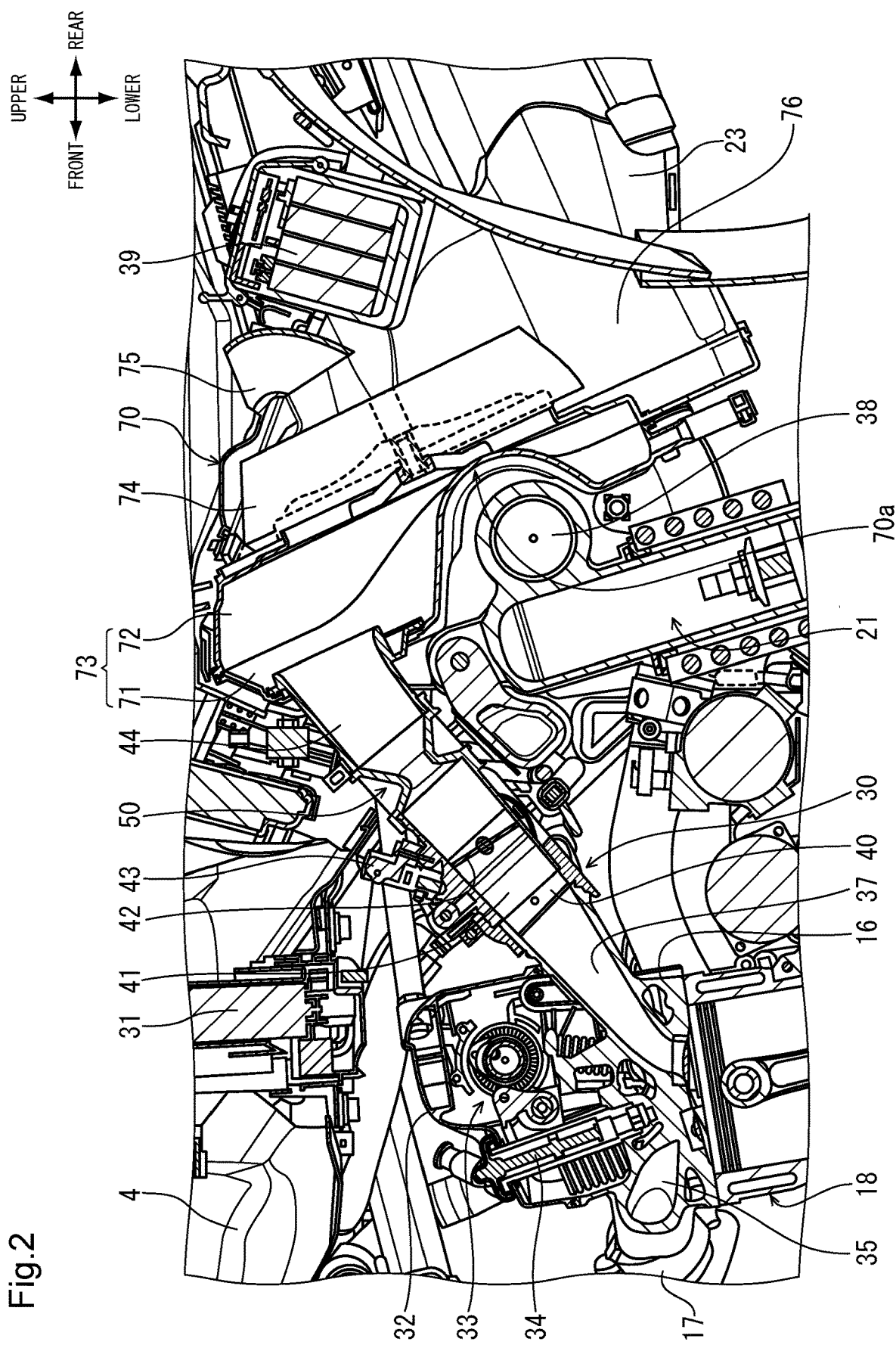
FIG. 2 is a partial enlarged cross-sectional view of parts around the intake passage 30 in the motorcycle.

FIG. 2 is a partial enlarged cross-sectional view of parts around the intake passage 30 in the motorcycle 1. As described previously, the cylinder head 16 of the engine 18 has an exhaust port 35 and an intake port 37. The exhaust pipe 17 is connected with the exhaust port 35. The intake passage 30 is connected with the intake port 37. A valve actuating mechanism 33 for intake and exhaust valves and an ignition plug 34 are disposed in the cylinder head 16. A cylinder head cover 32 covers an upper opening in the cylinder head 16. A fuel pump 31 is disposed at a bottom portion of the fuel tank 4 disposed superior to the cylinder head cover 32. The fuel pump 31 sends fuel under pressure to an injector 43 disposed in the intake passage 30.

The intake passage 30 has a read end portion connected with a front surface portion of the air cleaner box 70. The rear cushion 21 including a reservoir tank 38 is disposed inferior to the intake passage 30 and the air cleaner box 70. The air cleaner box 70 has a recess 70a formed on a vehicle body anterior side thereof. The recess 70a is intended to avoid interference with the reservoir tank 38. The air cleaner box 70 includes a front-side half body 73 and a rear-side half body 76. The front-side half body 73 has the recess 70a formed therein. The rear-side half body 76 houses an air filter 74. An intake pipe 75 is mounted on an upper surface of the rear-side half body 76. Outside air is drawn in the intake pipe 75 from a portion inferior to the seat 28. A battery 39 is disposed posterior to the intake pipe 75. The battery 39 supplies electric power to a starter motor and a headlight, for example.

The front-side half body 73 of the air cleaner box 70 includes a front portion 71 and a rear portion 72 coupled with each other. The intake passage 30 has a rear end portion fixed into an opening in the front portion 71. The intake passage 30 forms a linear intake flow passage between the intake port 37 and the air cleaner box 70. The intake passage 30 includes a connection ring 40, a throttle body 41, a connecting tube 50, and an intake funnel 44. The connection ring 40 is formed of an elastic material such as rubber. The throttle body 41, formed of metal, includes the injector 43 and a throttle valve 42. The connecting tube 50 is formed of an elastic material such as rubber. The intake funnel 44 is formed of, for example, a hard synthetic resin. The connection ring 40, the throttle body 41, the connecting tube 50, and the intake funnel 44 are arranged in sequence from the anterior side of the vehicle body and connected with each other to constitute the intake passage 30. In the embodiment, the linearly formed intake passage 30 allows coupling rigidity among different parts to be enhanced and prevents force to bend the intake passage 30 from being readily generated.

Figure 3:
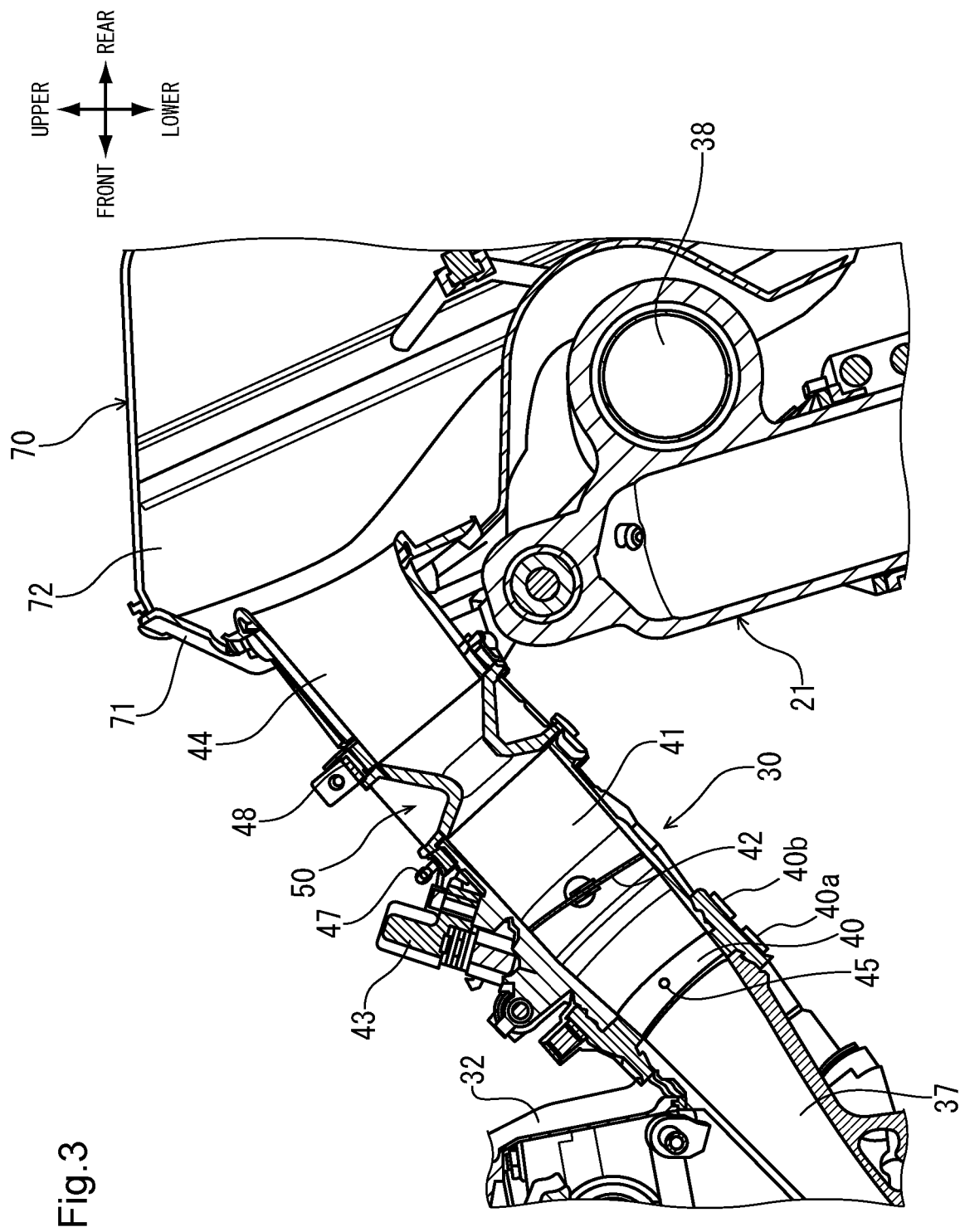
FIG. 3 is a partial enlarged view of the parts around the intake passage depicted in FIG. 2.

FIG. 3 is a partial enlarged view of the parts around the intake passage 30 depicted in FIG. 2. The connection ring 40 has a through hole 45 formed in a right lateral surface thereof in the vehicle width direction. A control vacuum for an EGR valve that recirculates exhaust gas to the intake port 37 is taken from the through hole 45. The connection ring 40 has a downstream end covering an outer circumference of an upstream end of a metal pipe that constitutes the intake port 37 and fixed tightly by a thin plate-shaped band 40a. Additionally, the connection ring 40 has an upstream end covering an outer circumference of a downstream end of the throttle body 41 and fixed tightly by a thin plate-shaped band 40b. The connecting tube 50 has a downstream end covering an outer circumference of an upstream end of the throttle body 41 and fixed tightly by a thin plate-shaped band 47. The connecting tube 50 has an upstream end covering an outer circumference of a downstream end of the intake funnel 44 and fixed tightly by a thin plate-shaped band 48. During assembling and servicing the vehicle, the elastic force of the connection ring 40 and the connecting tube 50 enables each of the parts to be easily removed and reinstalled, enhances the airtightness by being fastened by the bands 47 and 48, and prevents oscillations of the engine 18 from being transmitted to the throttle body 41 and the air cleaner box 70.

The connecting tube 50 of the embodiment has a protrusion that protrudes largely on an inner circumferential surface side thereof so as to function as a constriction part constricting a passage for intake air. The connection of the connecting tube 50 having the protrusion with the upstream side of the throttle body 41 enables reduction in engine noise and load of an intake air vacuum applied to the butterfly type throttle valve 42.

Figure 4:
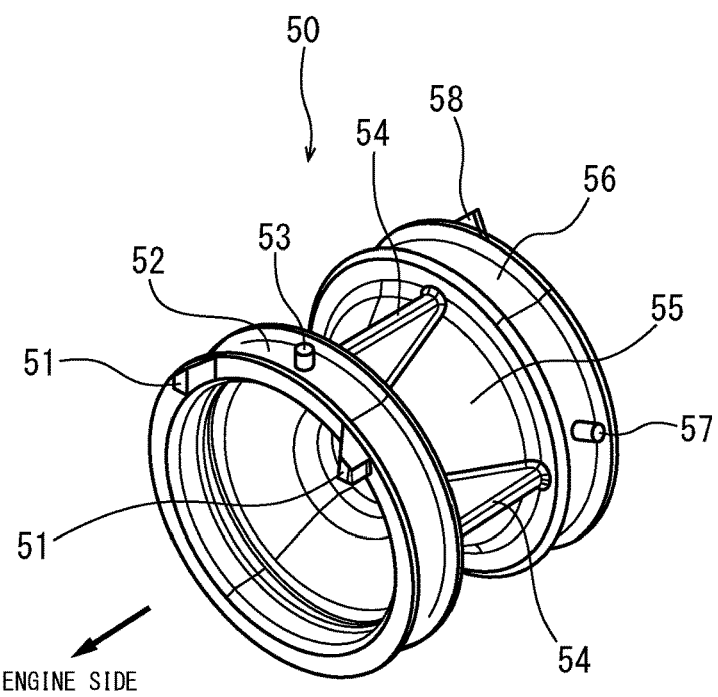
FIG. 4 is a perspective view of the constriction part.
Figure 5:
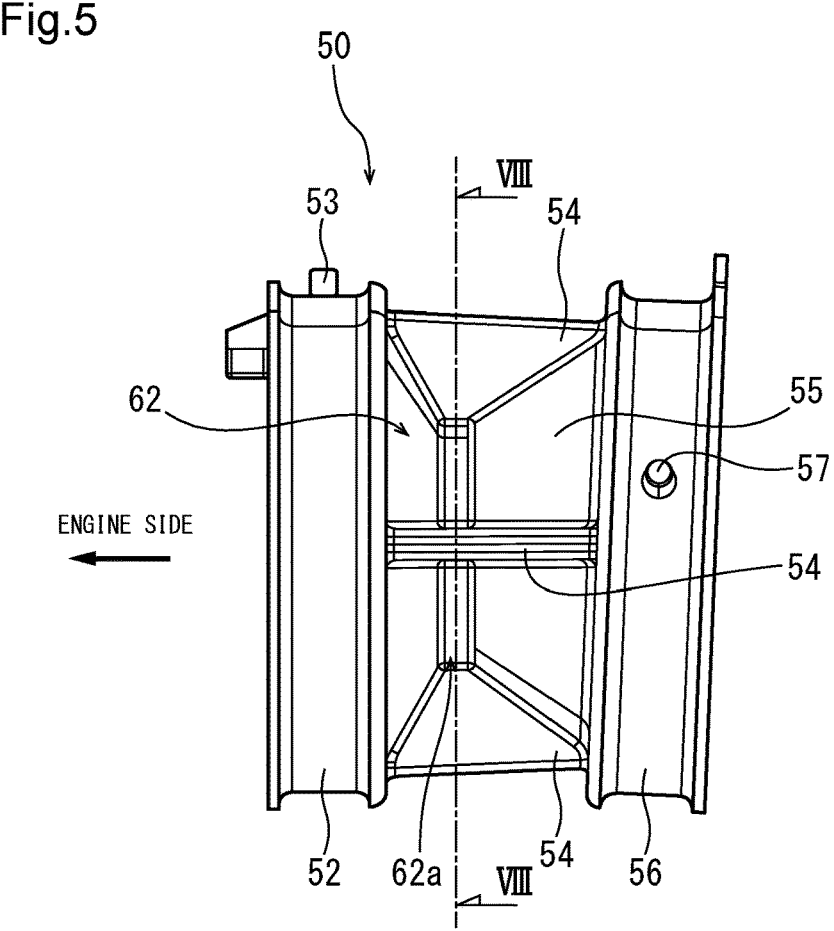
FIG. 5 is a side elevational view of the constriction part.
Figure 6:
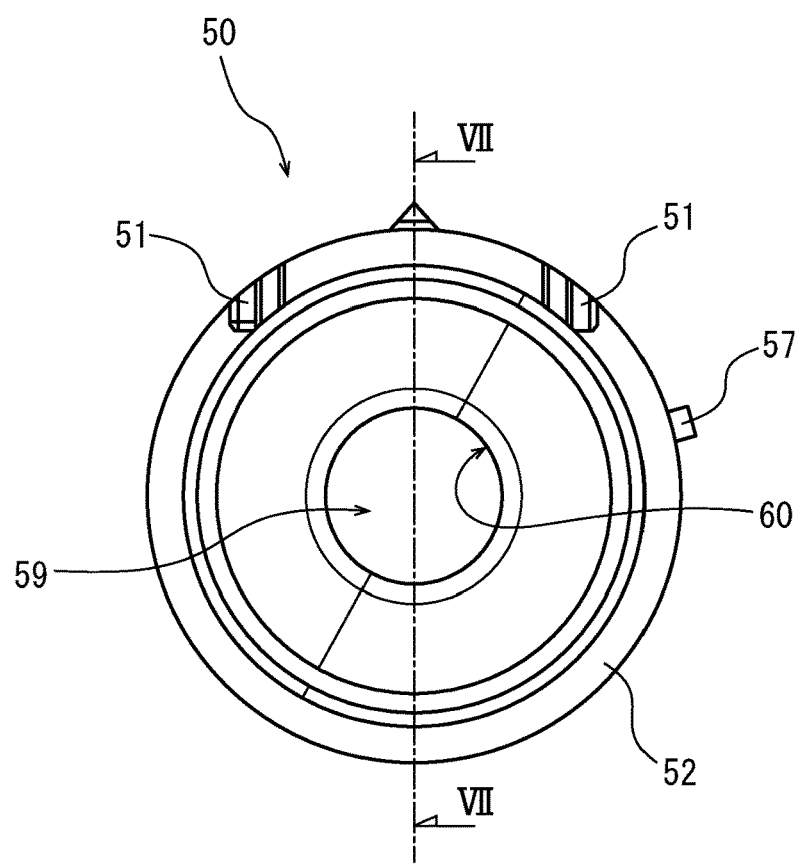
FIG. 6 is a front elevational view of the constriction part 50 as viewed from the engine side.
Figure 7:
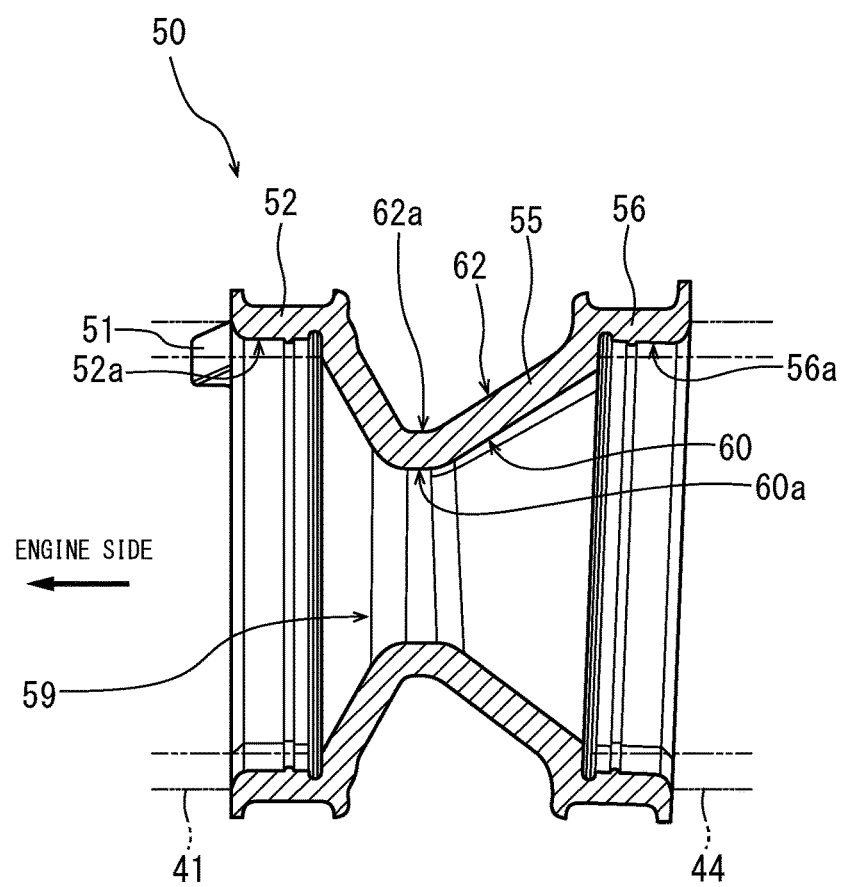
FIG. 7 is a cross-sectional view taken along line VII-VII in FIG. 6.
Figure 8:
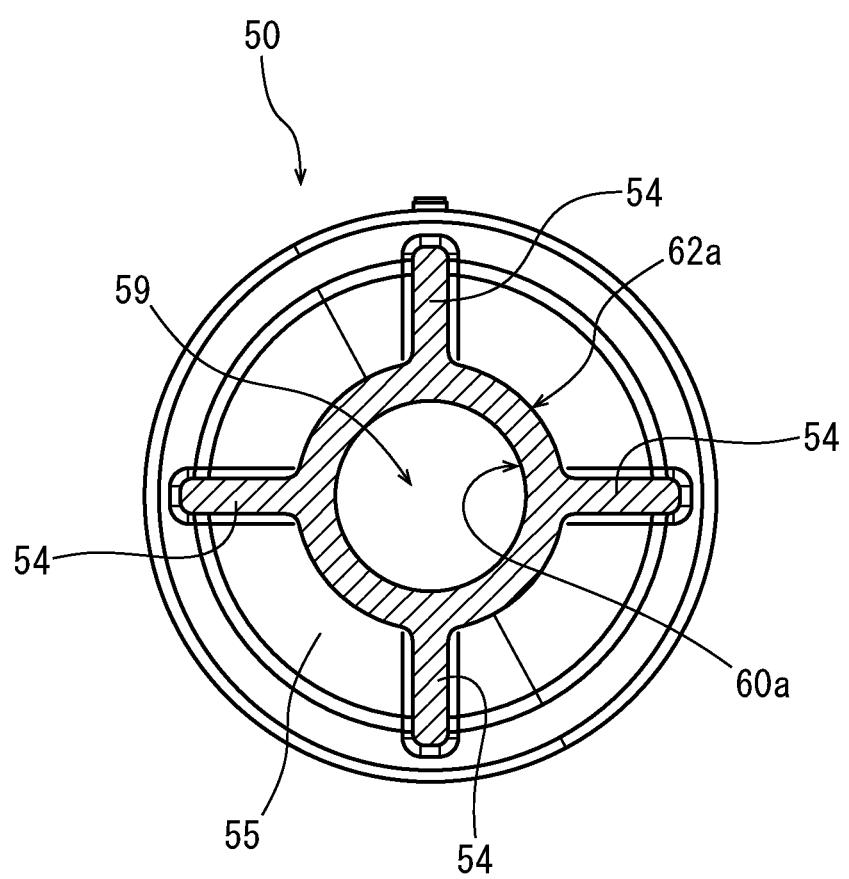
FIG. 8 is a cross-sectional view taken along line VIII-VIII in FIG. 5.

FIG. 4 is a perspective view of the connecting tube 50 (hereinafter, may be referred to also as a constriction part). FIG. 5 is a side elevational view of the constriction part 50. FIG. 6 is a front elevational view of the constriction part 50 as viewed from the engine side. FIG. 7 is a cross-sectional view taken along line VII-VII in FIG. 6. FIG. 8 is a cross-sectional view taken along line VIII-VIII in FIG. 5.

The constriction part 50 includes a constriction path 55, a first connection 52, and a second connection 56. The constriction path 55 has a protrusion 60 formed to protrude on the inner circumferential side. The first connection 52 and the second connection 56, each having a cylindrical shape, are disposed on both ends of the constriction path 55. The first connection 52 connected with an end outer circumference of the throttle body 41 has a positioning tab 53 for the band 47. The positioning tab 53 is disposed on an outer circumferential portion of the first connection 52. The second connection 56 connected with an end outer circumference of the intake funnel 44 has a positioning tab 57 for the band 48. The positioning tab 57 is disposed on an outer circumferential portion of the second connection 56. Ribs are provided in a standing condition throughout an entire circumference on both ends of the outer circumference on which each of the positioning tabs 53 and 57 is formed. The ribs guide positions in a flow passage direction of the bands 47 and 48. Additionally, to prevent erroneous assembly during the assembly procedure, the first connection 52 has engagement protrusions 51 to be engaged with the throttle body 41 and the second connection 56 has an indicator plate 58 indicating an assembling direction. Specifically, the engagement protrusions 51 are disposed on an end face of the first connection 52. The indicator plate 58 is disposed on a guide rib end face of the second connection 56.

When the throttle body 41 is connected with the first connection 52, the end outer circumference of the throttle body 41 contacts an inner circumferential surface 52a of the first connection 52. This results in the intake flow passage in the first connection 52 being formed by an inner circumferential surface of the throttle body 41. When the intake funnel 44 is connected with the second connection 56, the end outer circumference of the intake funnel 44 contacts an inner circumferential surface 56a of the second connection 56. This results in the intake flow passage in the second connection 56 being formed by an inner circumferential surface of the intake funnel 44. The intake flow passage in the first connection 52 has a circular cross-sectional shape that is substantially identical to a cross-sectional shape of the second connection 56.

The constriction path 55 is configured such that a cylindrical member having a uniform wall thickness has a lateral surface recessed inwardly in a radial direction. The protrusion 60 in the embodiment is formed such that the intake flow passage in the first connection 52 and the second connection 56 is constricted so as to taper toward a circular constriction opening 59 formed by an apex 60a and an outer circumferential surface 62 of the constriction path 55 is formed to follow the shape of the protrusion 60. Additionally, the outer circumferential surface 62 has a most recessed portion 62a disposed inside the inner circumferential surface 52a of the first connection 52 and the inner circumferential surface 56a of the second connection 56 in the radial direction.

As described above, the constriction path 55 of the constriction part 50 is formed of a plate member having a substantially uniform (e.g., 4 mm) wall thickness. Thus, the weight of the constriction part 50 can be prevented from increasing even when the protrusion 60 protrudes largely on the inner circumferential side of the constriction part 50. Additionally, machining the protrusion 60 causes an outer wall of the constriction path 55 to have a thinner thickness, resulting in reduced strength. Thus, a user, for example, can be prevented from attempting to machine the protrusion 60 to thereby change the flow passage shape.

Ribs 54 are disposed on the outer circumferential surface 62 of the constriction path 55. The ribs 54 connect between the first connection 52 and the second connection 56. The ribs 54, four in total, are disposed at 90 degrees intervals to extend in the flow passage direction. The ribs 54 each have a wall thickness substantially identical to the wall thickness of the constriction path 55. This arrangement enhances rigidity and deformation resistance of the constriction path 55, while minimizing an increase in weight. The ribs 54 may each be, for example, marked on a lateral surface so as to prevent erroneous assembly during the assembly procedure.

Figure 9:
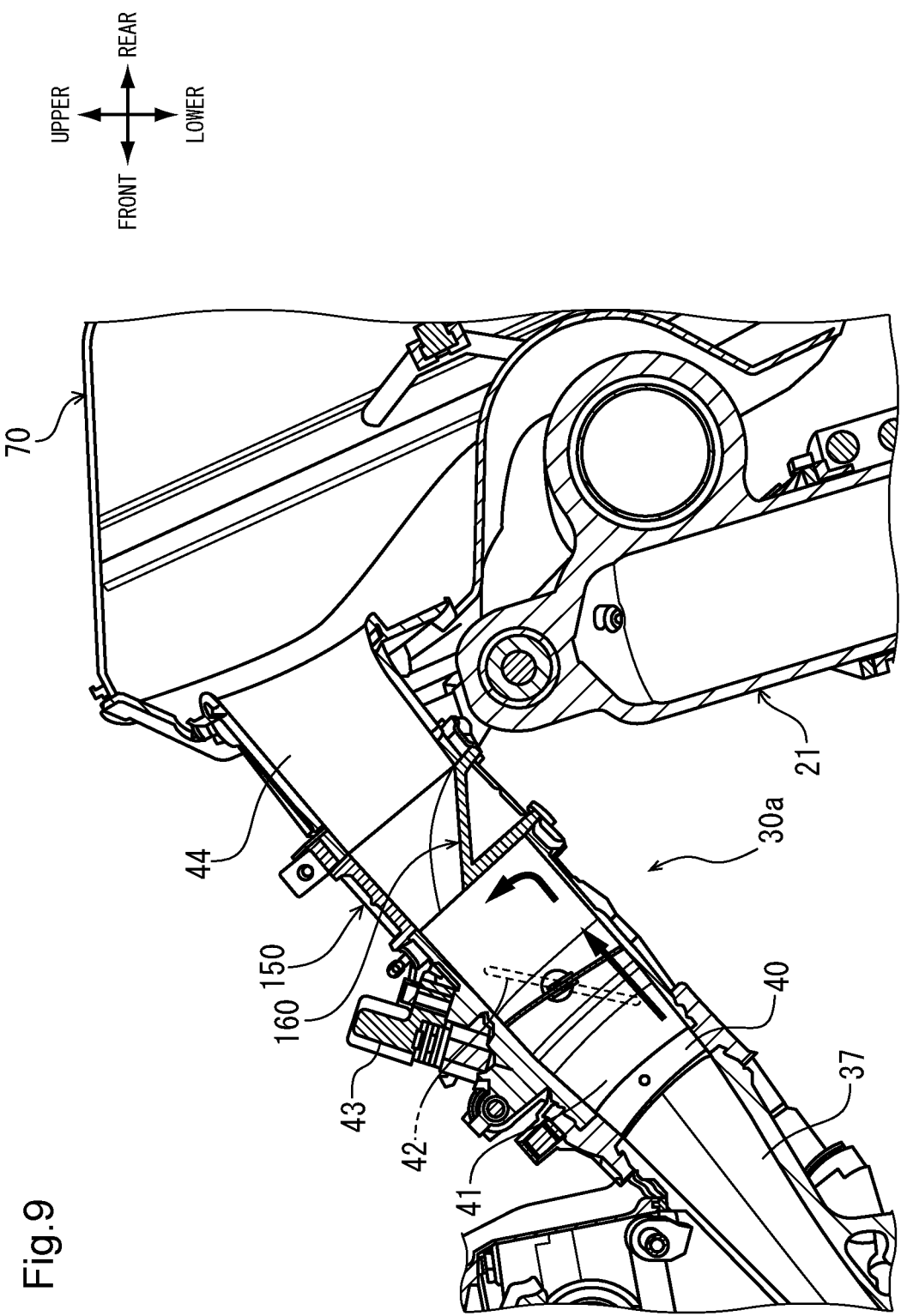
FIG. 9 is a cross-sectional view of an intake passage structures to which a constriction part according to a second embodiment is applied.
Figure 10:
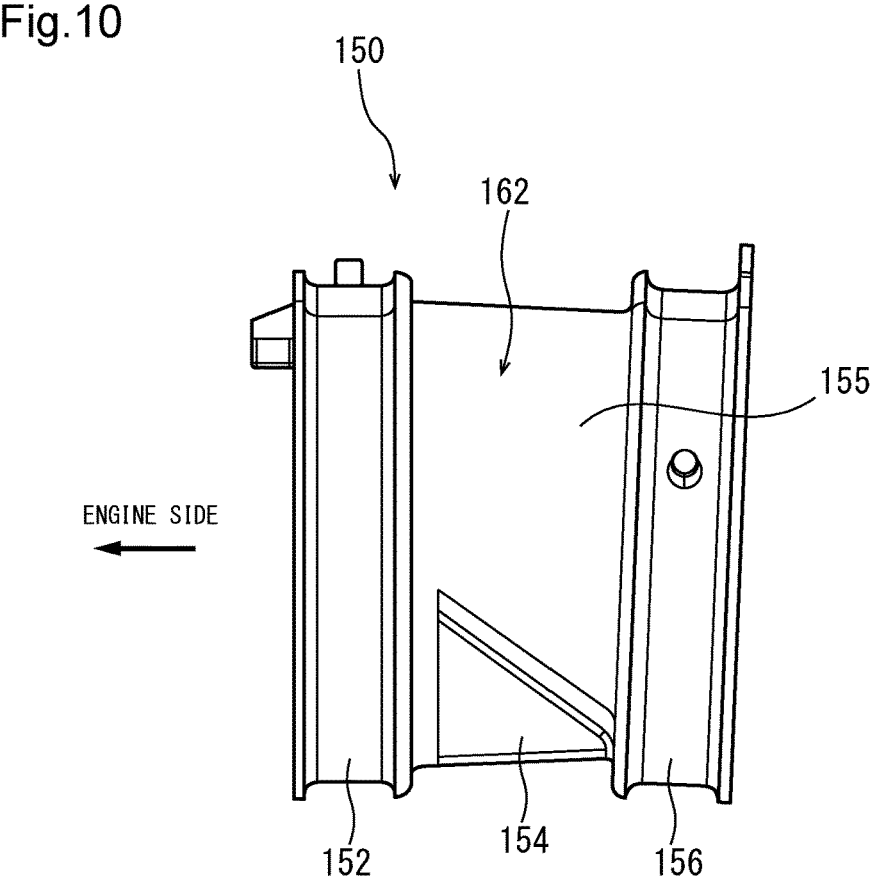
FIG. 10 is a side elevational view of the constriction part according to a second embodiment.
Figure 11:
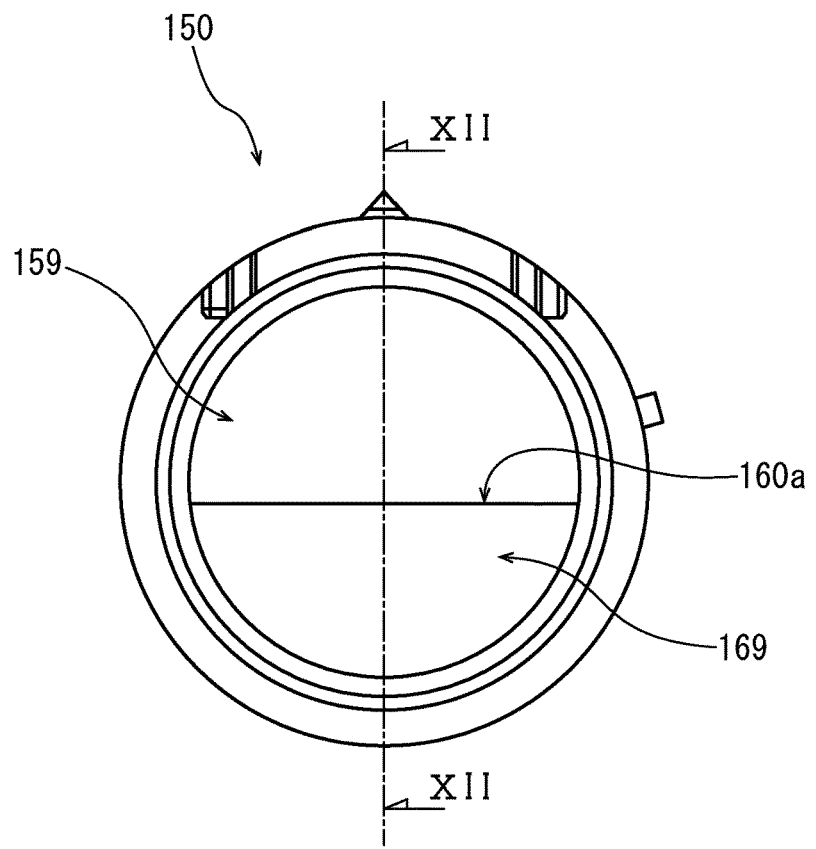
FIG. 11 is a front elevational view of the constriction part 150 as viewed from the engine side.
Figure 12:
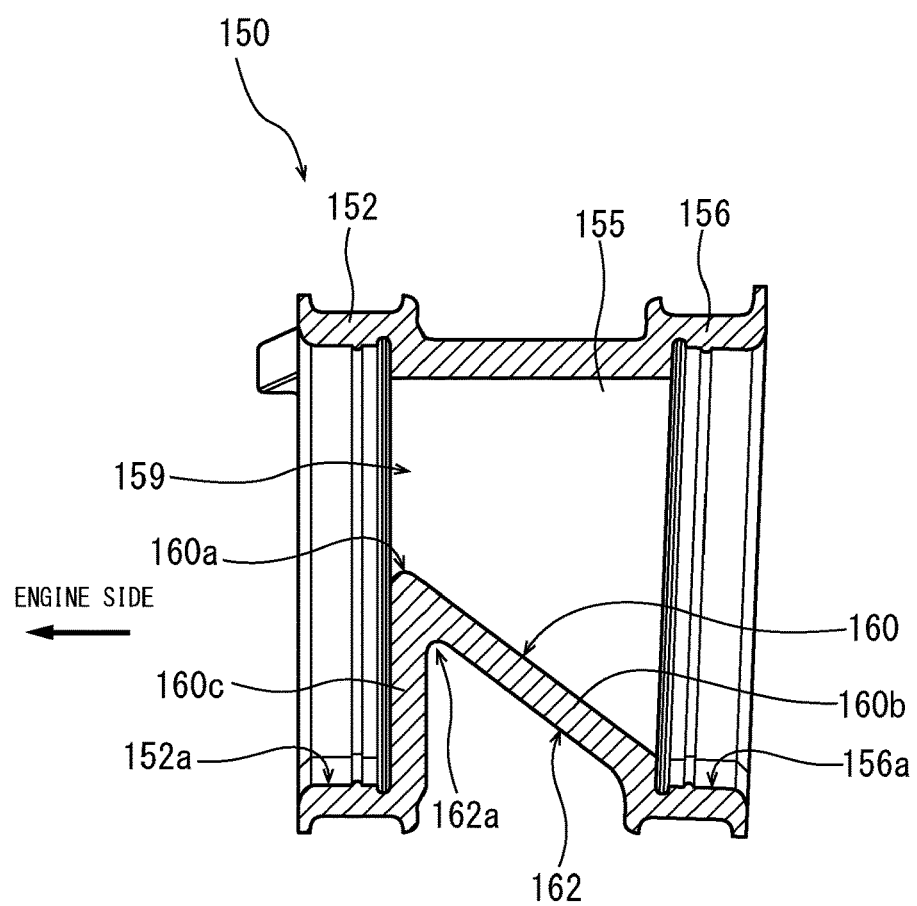
FIG. 12 is a cross-sectional view taken along line XII-XII in FIG. 11.

FIG. 9 is a cross-sectional view of a configuration of an intake passage 30a to which a constriction part 150 according to a second embodiment of the present invention is applied. FIG. 10 is a side elevational view of the constriction part 150. FIG. 11 is a front elevational view of the constriction part 150 as viewed from the engine side. FIG. 12 is a cross-sectional view taken along line XII-XII in FIG. 11.

The constriction part 150 differs from the constriction part 50 described with reference to the first embodiment only in a shape of a constriction path 155. A protrusion 160 that protrudes on an inner circumferential side of the constriction path 155 has a shape that occupies substantially half of the intake flow passage on a vehicle body inferior side. The protrusion 160 has an apex 160a extending in the vehicle width direction. The protrusion 160 further includes a taper 160b and a wall 160c. The taper 160b gradually constricts the flow passage shape toward a constriction opening 159. The wall 160c extends perpendicularly to the flow passage direction.

The shape of the constriction path 155 described above constricts the intake flow passage to thereby reduce load of an intake air vacuum applied to the throttle valve 42, while reducing engine noise. In addition, even when a mixture heavier than air flows back along an inner circumferential surface on the vehicle body inferior side of the intake passage 30a due to mixture spit-back, the shape of the constriction path 155 allows the wall 160c to receive the mixture. Thus, the spit-back mixture can be prevented from reaching the air cleaner box 70 and sticking to the air filter 74.

As with the constriction part 50 described earlier, the constriction path 155 of the constriction part 150 is formed of a plate member having a substantially uniform wall thickness and having the protrusion 160 does not readily increase the weight of the constriction part 150. Additionally, machining the protrusion 160 causes an outer wall of the constriction path 155 to have a thinner thickness, resulting in reduced strength. Thus, the user, for example, can be prevented from attempting to machine the protrusion 160 to thereby change the flow passage shape. A rib 154 is disposed at a position corresponding to the protrusion 160 on an outer circumferential surface 162 of the constriction path 155. The rib 154 connects between a first connection 152 and a second connection 156. The rib 154 enhances rigidity and deformation resistance of the constriction path 155, while minimizing an increase in weight.

Figure 13:
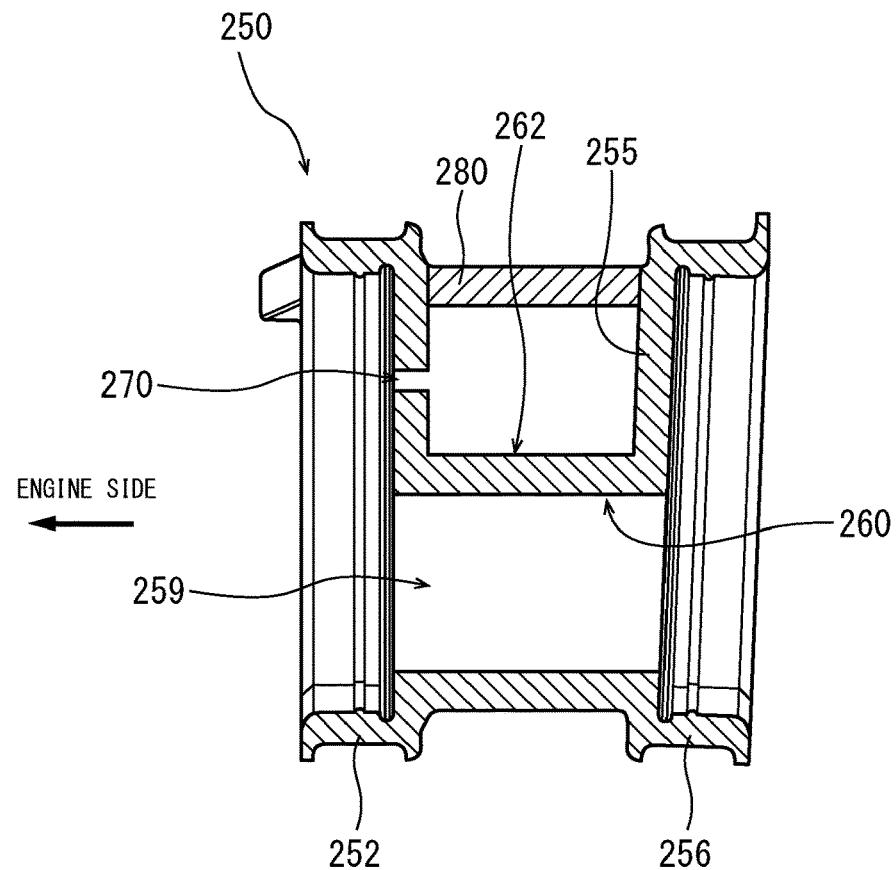
FIG. 13 is a cross-sectional view of a constriction part according to a third embodiment.

FIG. 13 is a cross-sectional view of a constriction part 250 according to a third embodiment of the present invention. The constriction part 250 differs from the constriction part 50 described with reference to the first embodiment in a shape of a constriction path 255. A protrusion 260 that protrudes on an inner circumferential side of the constriction path 255 is formed into a closed-bottom box shape that protrudes from the vehicle body superior side to the vehicle body inferior side of the intake flow passage. A lid 280 is fitted to close an opening in an upper portion of the protrusion 260. The protrusion 260 has a lateral surface on the engine side, in which a through hole 270 is formed.

In the constriction path 255 according to the third embodiment, the protrusion 260 constricts the intake flow passage to a constriction opening 259. Additionally, a space enclosed by an outer circumferential surface 262 of the protrusion 260 and the lid 280 functions as a resonator chamber, so that intake noise can be reduced.

Figure 14:
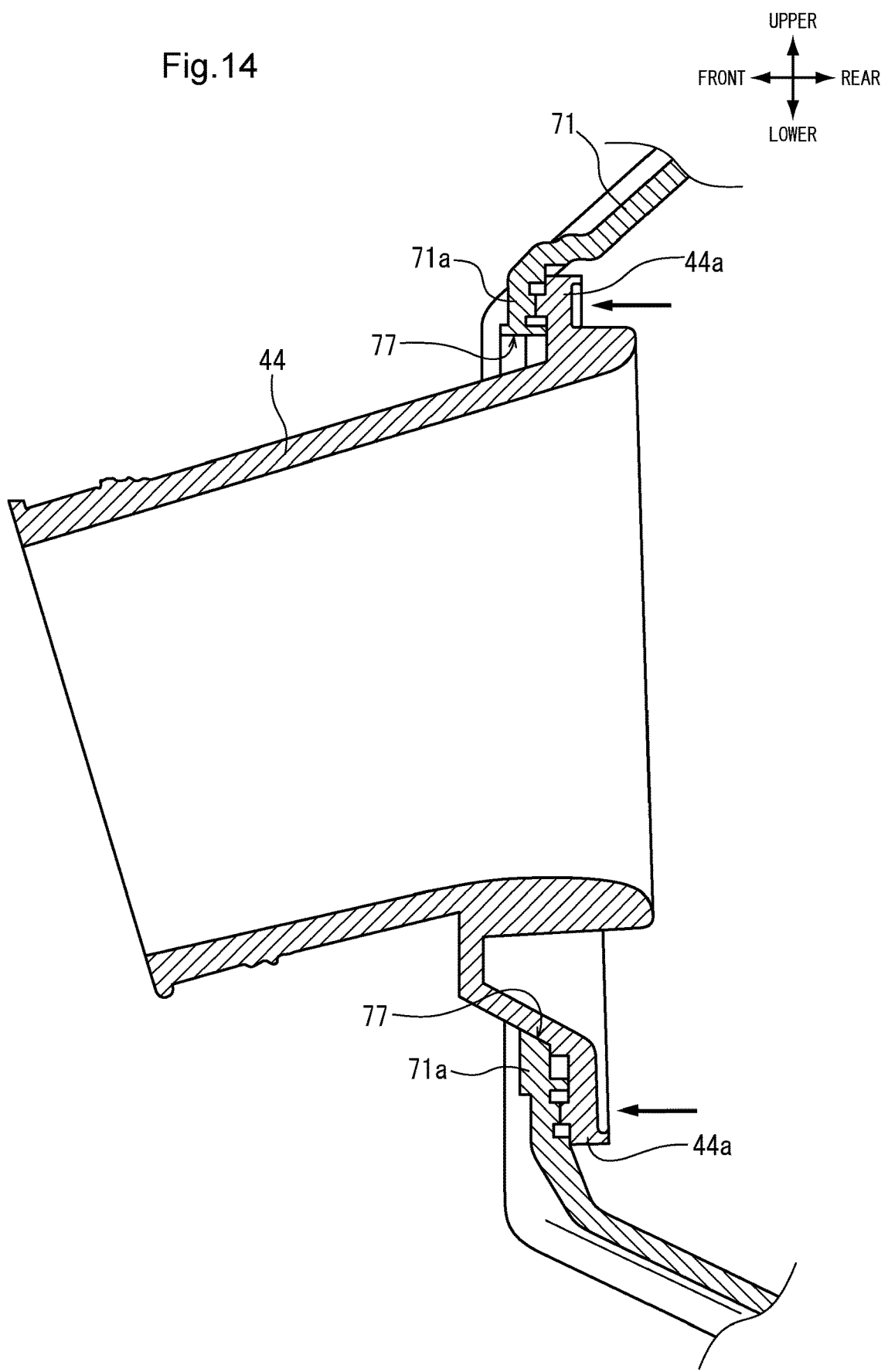
FIG. 14 is a cross-sectional view of a joint structure between the intake funnel that constitutes the rear end portion of the intake passage and the air cleaner box.

FIG. 14 is a cross-sectional view of a joint structure between the intake funnel 44 that constitutes the rear end portion of the intake passage 30 and the air cleaner box 70. The intake funnel 44 is inserted, from a posterior side of the vehicle body, in an opening 77 in the front portion 71 of the front-side half body 73 that forms part of the air cleaner box 70. A first flange 71a that constitutes a perimeter of the opening 77 and a second flange 44a formed at a rear end of the intake funnel 44 are then subjected to thermal welding throughout an entire circumference indicated by the arrow in FIG. 14. The second flange 44a on the vehicle body inferior side is formed into an end of a plate member extending inferiorly in a standing condition from the intake funnel 44, thereby enhancing support rigidity with respect to the opening 77.

Figure 15:
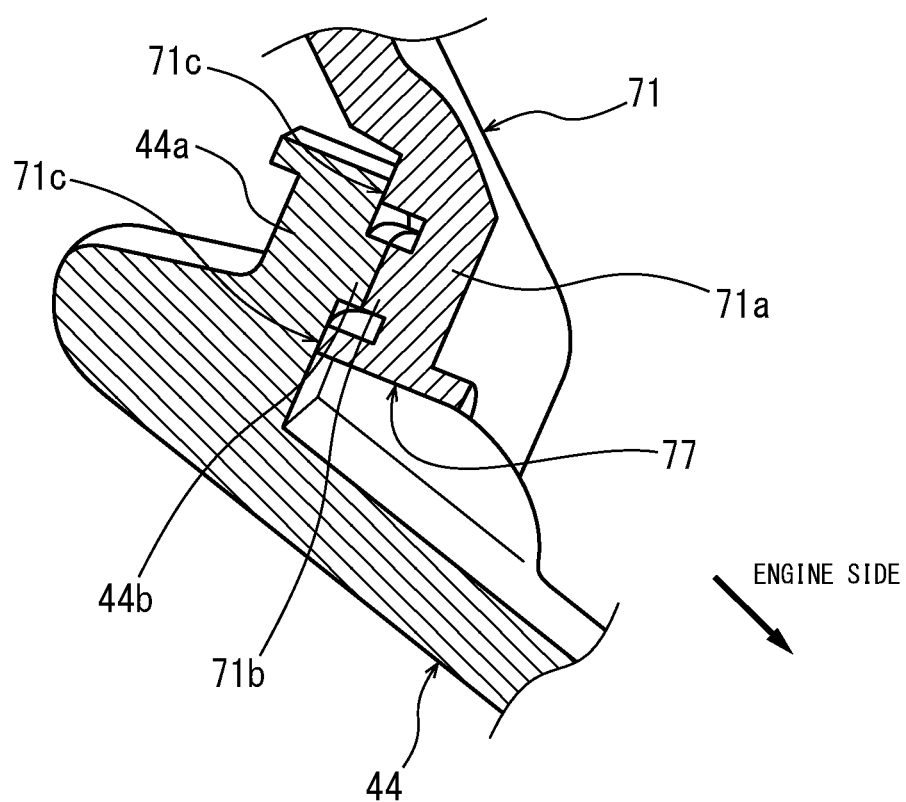
FIG. 15 is an enlarged cross-sectional view of the thermally welded portion.

FIG. 15 is an enlarged cross-sectional view of the thermally welded portion. The first flange 71a of the front portion 71 has a first annular protrusion 71b that is formed into a circularly annular shape extending over an entire circumference. The second flange 44a of the intake funnel 44 has a surface on the engine side, on which a second annular protrusion 44b that is formed into a circularly annular shape extending over an entire circumference is formed. The first annular protrusion 71b is formed by machining two grooves in an inner wall 71c of the front portion 71. Additionally, the first annular protrusion 71b has an apex disposed at a position lower than the inner wall 71c.

When the intake funnel 44 is inserted into the opening 77 in the front portion 71 from the vehicle body posterior side, a ceiling surface of the first annular protrusion 71b contacts a ceiling surface of the second annular protrusion 44b and the second flange 44a abuts on the inner wall 71c of the first flange 71a. The thermal welding is performed such that the second annular protrusion 44b is pressed against the first annular protrusion 71b from the inside of the front portion 71.

The foregoing arrangements result in the following. Specifically, when the first flange 71a and the second flange 44a are fixed through thermal welding, the ceiling surface of the first annular protrusion 71b contacts the ceiling surface of the second annular protrusion 44b and, in addition, the inner wall 71c of the first flange 71a contacts one surface of the second flange 44a on the inside and outside in the radial direction of the annular protrusions. Stress can thus be applied uniformly to the annular protrusions during the thermal welding and coupling rigidity by the thermal welding can be enhanced.

Figure 16:
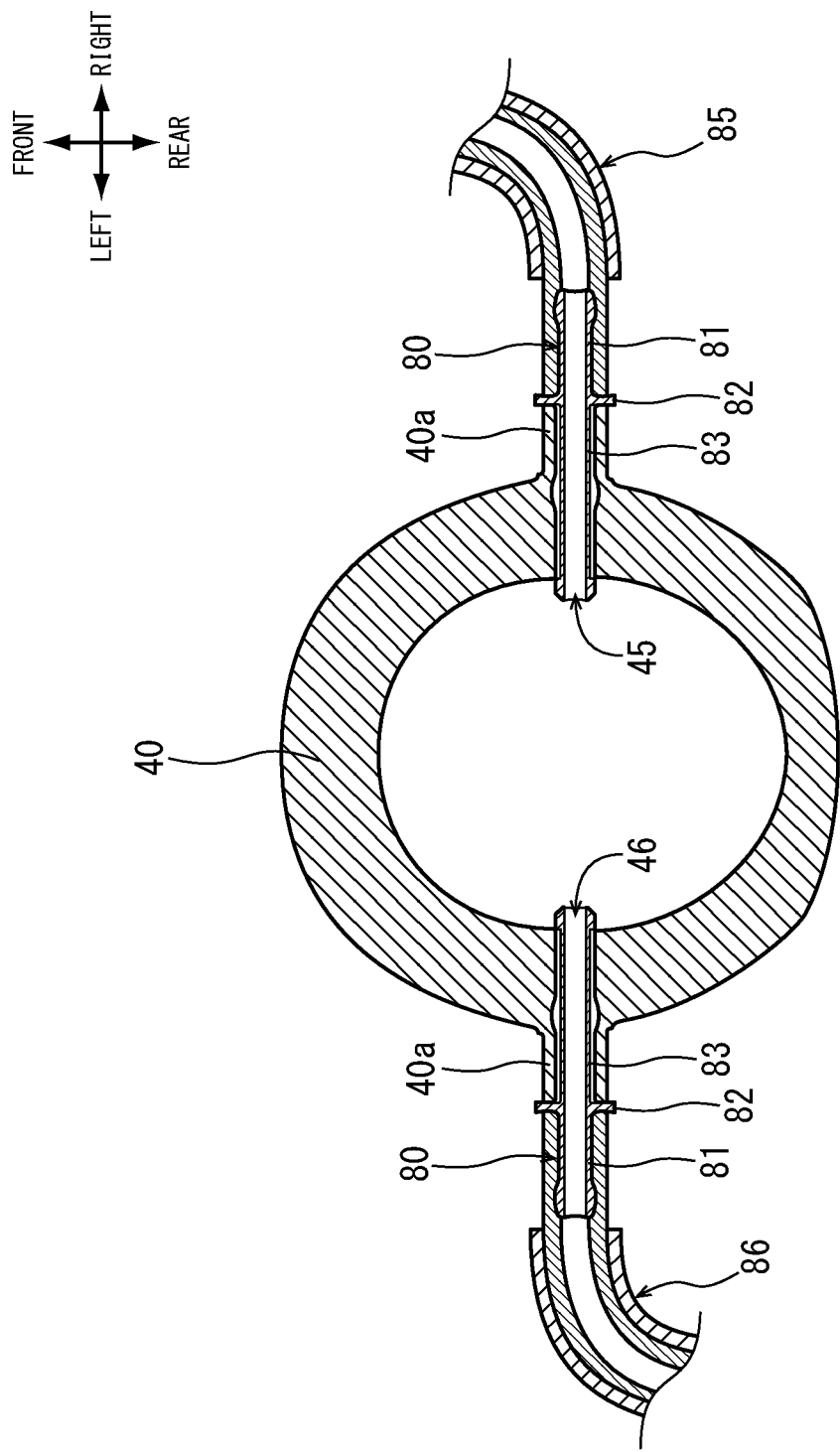
FIG. 16 is a cross-sectional view of the connection ring.

FIG. 16 is a cross-sectional view of the connection ring 40. The connection ring 40 has the first through hole 45 formed in the right lateral surface thereof in the vehicle width direction. A control vacuum for the EGR valve that recirculates exhaust gas to the intake port 37 is taken from the first through hole 45. The connection ring 40 further has a second through hole 46 formed in the left lateral surface thereof in the vehicle width direction. Evaporative gas adsorbed by a charcoal canister is drawn in through the second through hole 46.

The connection ring 40 is shaped to be bilaterally symmetrical. Cylindrical portions 40a protruding to the outside from the respective through holes 45 and 46 are also shaped to be identical to each other. A common part may therefore be manufactured for a metal pipe joint 80 for connecting lines 85 and 86 with the respective through holes 45 and 46, so that production cost can be reduced. The pipe joint 80 includes an inside pipe 83 and an outside pipe 81 across a flange 82. The inside pipe 83 protrudes into the inside of the intake flow passage. The outside pipe 81 receives each of the lines 85 and 86 inserted thereover.

Figure 17:
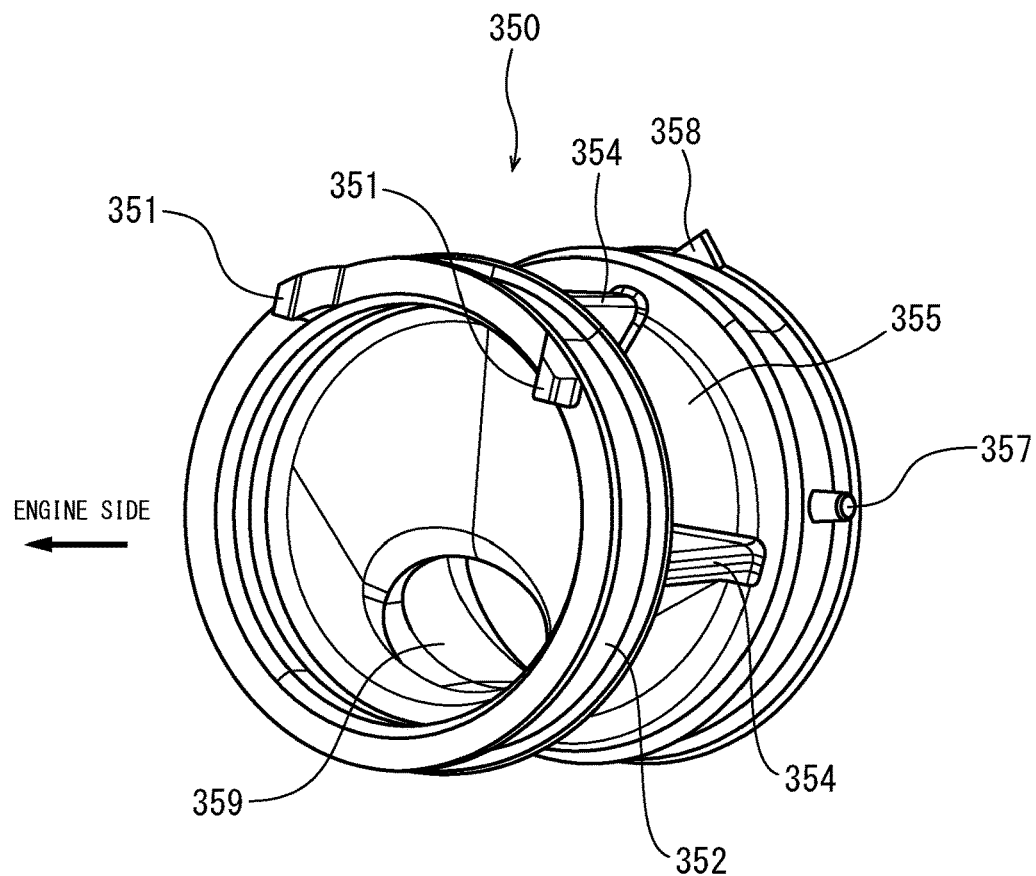
FIG. 17 is a perspective view of a constriction part according to a fourth embodiment of the present invention.
Figure 18:
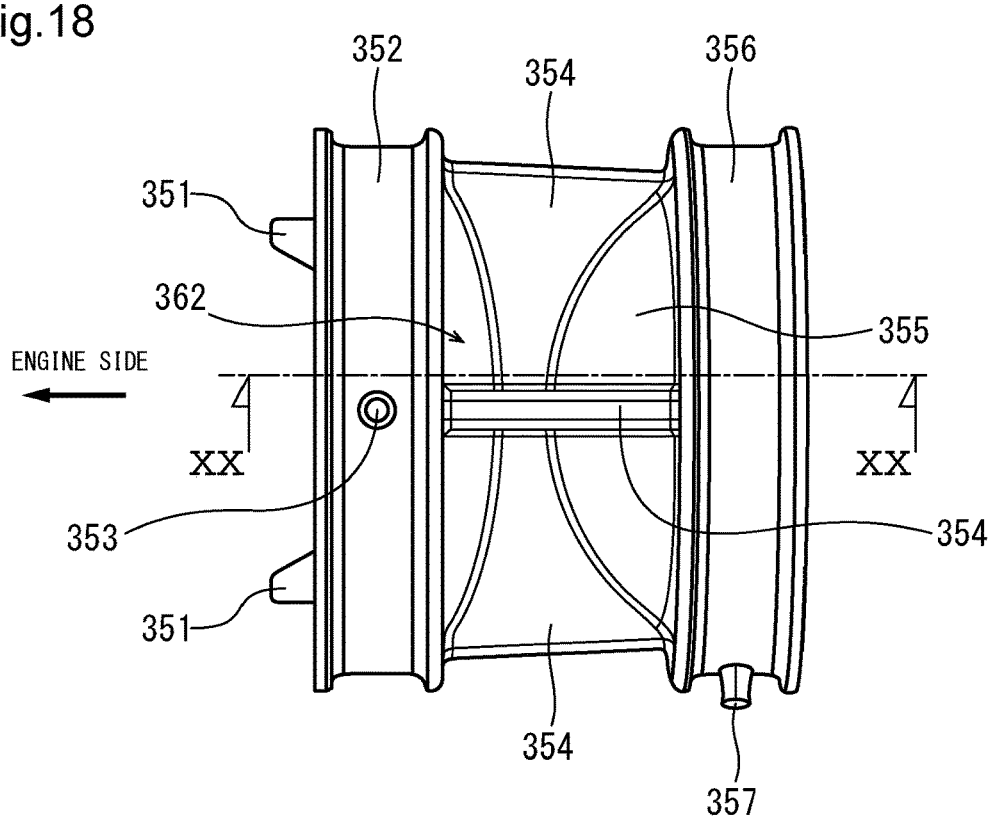
FIG. 18 is a side elevational view of the constriction part according to a fourth embodiment.
Figure 19:
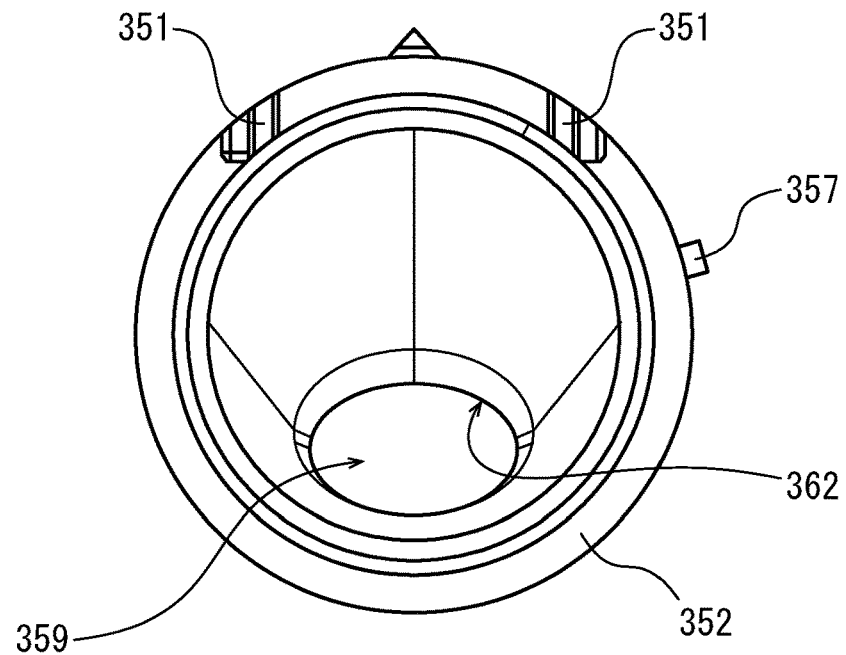
FIG. 19 is a front elevational view of the constriction part according to a fourth embodiment as viewed from the engine side.
Figure 20:
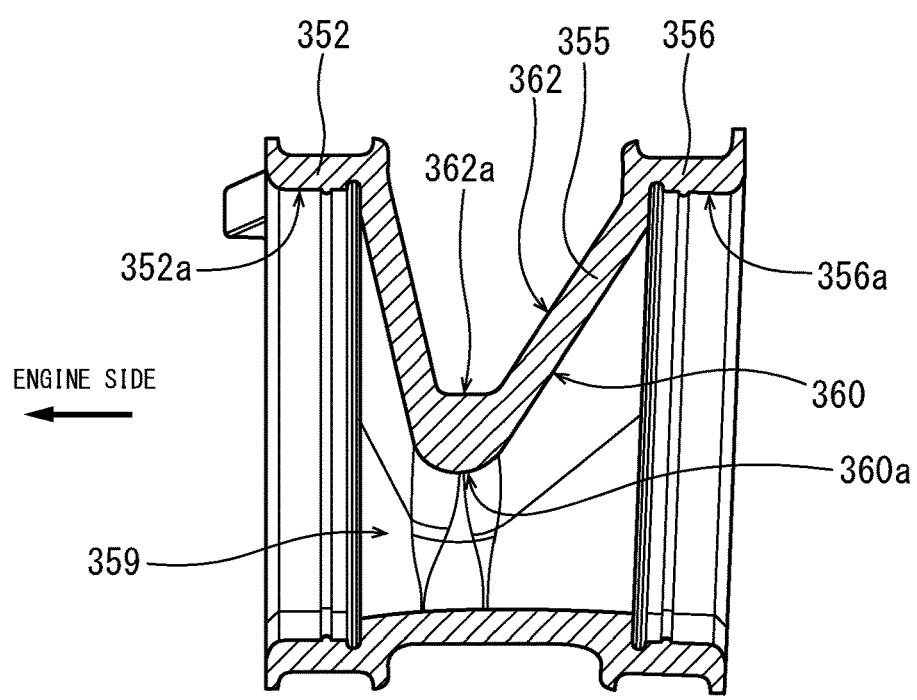
FIG. 20 is a cross-sectional view taken along line XX-XX in FIG. 18.

FIG. 17 is a perspective view of a constriction part 350 according to a fourth embodiment of the present invention. FIG. 18 is a side elevational view of the constriction part 350. FIG. 19 is a front elevational view of the constriction part 350 as viewed from the engine side. FIG. 20 is a cross-sectional view taken along line XX-XX in FIG. 18.

The constriction part 350 differs from the constriction part 50 described with reference to FIGS. 4 to 8 only in shapes of a constriction path 355 and ribs 354. The constriction part 350 includes a cylindrical first connection 352 and a cylindrical second connection 356 disposed across the constriction path 355 that has a protrusion 360 protruding on an inner circumferential side. The first connection 352 connected with the end outer circumference of the throttle body 41 has a positioning tab 353 for the band 47. The positioning tab 353 is disposed on an outer circumferential portion of the first connection 352. The second connection 356 connected with the end outer circumference of the intake funnel 44 has a positioning tab 357 for the band 48. The positioning tab 357 is disposed on an outer circumferential portion of the second connection 356. Ribs are provided in a standing condition throughout an entire circumference on both ends of the outer circumference on which each of the positioning tabs 353 and 357 is formed. The ribs guide positions in the flow passage direction of the bands 47 and 48. Additionally, to prevent erroneous assembly during the assembly procedure, the first connection 352 has engagement protrusions 351 to be engaged with the throttle body 41 and the second connection 356 has an indicator plate 358 indicating an assembling direction. Specifically, the engagement protrusions 351 are disposed on an end face of the first connection 352. The indicator plate 358 is disposed on a guide rib end face of the second connection 356.

When the throttle body 41 is connected with the first connection 352, the end outer circumference of the throttle body 41 contacts an inner circumferential surface 352a of the first connection 352. This results in the intake flow passage in the first connection 352 being formed by an inner circumferential surface of the throttle body 41. When the intake funnel 44 is connected with the second connection 356, the end outer circumference of the intake funnel 44 contacts an inner circumferential surface 356a of the second connection 356. This results in the intake flow passage in the second connection 356 being formed by an inner circumferential surface of the intake funnel 44. The intake flow passage in the first connection 352 has a circular cross-sectional shape that is substantially identical to a cross-sectional shape of the second connection 356.

The constriction path 355 is configured such that a cylindrical member having a uniform wall thickness has a lateral surface recessed inwardly in a radial direction. The protrusion 360 in the embodiment is formed such that the intake flow passage in the first connection 352 and the second connection 356 is constricted so as to taper toward a constriction opening 359 that is formed at a position offset inferiorly in the vehicle body by an apex 360a and an outer circumferential surface 362 of the constriction path 355 is formed to follow the shape of the protrusion 360. The constriction opening 359 is formed into a substantially elliptical shape having a major axis oriented toward the vehicle width direction. Additionally, the outer circumferential surface 362 has a most recessed portion 362a disposed inside the inner circumferential surface 352a of the first connection 352 and the inner circumferential surface 356a of the second connection 356 in the radial direction.

The shape of the constriction path 355 described above constricts the intake flow passage to thereby reduce engine noise. In addition, the constriction opening 359 disposed at the position offset inferiorly in the vehicle body results in the constriction opening 359 being disposed on the inferior side in the vehicle body on which the intake passage starts to open as the throttle valve 42 initiates an opening operation. This enables smooth inflow of the mixture particularly when the throttle opening remains small.

The ribs 354 are disposed on the outer circumferential surface 362 of the constriction path 355. The ribs 354 connect between the first connection 352 and the second connection 356. The ribs 354, three in total, are disposed at 90 degrees intervals to extend in the flow passage direction. The ribs 354 each have a wall thickness substantially identical to the wall thickness of the constriction path 355. This arrangement enhances rigidity and deformation resistance of the constriction path 355, while minimizing an increase in weight.

As described above, in the intake passage structure according to the embodiments of the present invention, parts that constitute the intake passage include the constriction part that includes the cylindrical connections disposed across the constriction path that has the protrusion formed therein. The constriction path has the outer circumferential surface recessed inwardly in the radial direction so as to follow the shape of the protrusion and the most recessed portion of the outer circumferential surface is disposed inside the inner circumferential surfaces of the connections in the radial direction. Thus, even with a large protrusion formed on the inner circumferential surface of the constriction part, the portion at which the protrusion is formed can have a minimized wall thickness, so that the weight of the intake passage can be prevented from increasing. Additionally, machining the protrusion results in a thinner wall thickness of the outer wall of the constriction path and in reduced strength. Thus, the user, for example, can be dissuaded from machining the protrusion to thereby change the flow passage shape.

It is noted that the construction and configuration of the motorcycle, shape and construction of the intake passage, shape of the intake port, shape and construction of the throttle body and the intake funnel, shape and material of the constriction part, and the like described above are illustrative only and not limiting and various changes may be made therein. For example, the position of the opening constricted by the apex of the protrusion may be changed in various ways in the flow passage direction or the radial direction. The intake passage structure according to the embodiments of the present invention can be applied to, not only motorcycles, but also various other types of vehicles in which the engine intake port is connected with the air cleaner box by an intake passage.

DESCRIPTION OF REFERENCE SYMBOLS

1 . . . Motorcycle, 18 . . . Engine, 30 . . . Intake passage, 37 . . . Intake port, 41 . . . Throttle body, 42 . . . Throttle valve, 44 . . . Intake funnel, 50 . . . Connecting tube (constriction part), 54 . . . Rib, 52 . . . First connection, 52a . . . Inner circumferential surface, 56 . . . Second connection, 56a . . . Inner circumferential surface, 55 . . . Constriction path, 59 . . . Constriction opening, 60 . . . Protrusion, 62 . . . Outer circumferential surface, 62a . . . Most recessed portion, 52 . . . First connection (connection), 52a . . . Inner circumferential surface, 56 . . . Second connection (connection), 56a . . . Inner circumferential surface, 70 . . . Air cleaner box, 150 . . . Constriction part, 160 . . . Protrusion, 160c . . . Wall, 350 . . . Constriction part, 352 . . . First connection, 352a . . . Inner circumferential surface, 356 . . . Second connection, 359 . . . Constriction opening

What is claimed is:

1. An intake passage structure applicable to an intake passage connected with an intake port of an engine of a vehicle comprising:
   a plurality of parts including a throttle body having a throttle valve, wherein the plurality of parts include a constriction part having a protrusion that protrudes on an inner circumferential surface side of the intake passage,
   wherein the constriction part includes cylindrical connections disposed on both sides of a constriction path in which the protrusion is formed, the connections connecting upstream and downstream parts,
   wherein the constriction path has an outer circumferential surface recessed inwardly in a radial direction so as to follow a shape of the protrusion,
   wherein a most recessed portion of the recessed outer circumferential surface is disposed inside inner circumferential surfaces of the connections in the radial direction,
   wherein the constriction part is formed of an elastic material,
   wherein the constriction path has at least one plate shaped rib disposed on the outer circumferential surface in a standing condition, the at least one plate-shaped rib connecting between the connections and being formed so that the height of the at least one plate-shaped rib increases from the connections toward the most recessed portion, and
   wherein a constriction opening constricted by an apex of the protrusion has an elliptical cross-sectional shape long in the vehicle width direction and having a center at a position offset in a vehicle body inferior side with respect to the connections.

2. The intake passage structure according to claim 1, wherein the constriction path has a uniform wall thickness.

3. The intake passage structure according to claim 1, wherein the constriction part is a connecting tube connected upstream of the throttle body.

4. The intake passage structure according to claim 1, wherein the intake passage is formed to extend linearly.

5. The intake passage according to claim 1, wherein the at least one plate-shaped rib is four ribs, the four ribs disposed at 90 degree intervals to extend in the flow passage direction.

6. The intake passage according to claim 1, wherein the at least one plate-shaped rib has a wall thickness substantially identical to a wall thickness of the constriction path.

7. The intake passage according to claim 1, wherein the height of the at least one plate-shaped rib increases continuously from the connections toward the most recessed portion.

8. The intake passage according to claim 1, wherein a maximum height of the at least one plate-shaped rib is greater than a width of the at least one plate-shaped rib in a circumferential direction.

9. The intake passage according to claim 1, wherein a bottom edge of the at least one plate-shaped rib is V-shaped.

10. The intake passage according to claim 9, wherein a top edge of the at least one plate-shaped rib is straight.

* * * * *